Aug. 25, 1953 E. E. HOOD 2,649,942
DRIVING MECHANISM FOR VELOCIPEDES AND THE LIKE
Filed Jan. 8, 1951
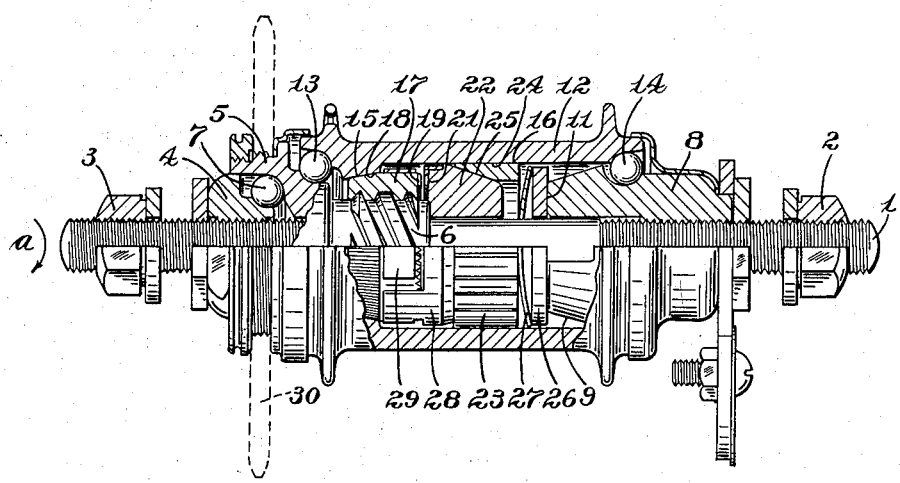
INVENTOR.
E. Elliott Hood Patented Aug. 25, 1953

2,649,942

UNITED STATES PATENT OFFICE 2,649,942

DRIVING MECHANISM FOR VELOCIPEDES AND THE LIKE

Edwin Elliott Hood, Elmira, N. Y., assignor to Bendix Aviation Corporation, a corporation of Delaware Application January 8, 1951, Serial No. 205,024

2 Claims. (Cl. 192—51)

The present invention relates to driving mechanism for velocipedes and the like, and more particularly to a clutch drive for wheel hubs which is convertible from a two-way drive to a coaster brake.

In the art of foot propelled vehicles, various forms of stabilizing attachments, etc. for juvenile bicycles have become popular for use by young children who have not yet acquired the skill of balancing a two-wheeled vehicle. As the child grows older and more proficient the outriggers are discarded and the bicycle operated in the conventional manner.

In this country bicycles are now almost universally provided with a hub type of coaster brake, but when they are used with stabilizing wheels, the brake is of small importance since operating speeds are low, and in fact the coaster is a disadvantage since it prevents a child from pedalling the vehicle backwards.

It is an object of the present invention to provide a novel hub clutch drive which is readily convertible from a two-way drive connection to a coaster brake and vice versa.

It is another object to provide such a device which is effective and durable in operation, and simple and economical in construction.

It is another object to provide such a device which utilizes the elements of the brake for the reverse drive operation, with slight modification, and with no change in the major actuating elements, so that the change-over is effected quickly and easily.

Further objects and advantages will be apparent from the following description taken in connection with the accompanying drawing in which the figure illustrates a preferred embodiment of the invention in side elevation, partly broken away and in section.

In the drawing there is illustrated a fixed axle 1 adapted to be clamped in the rear fork of a bicycle by means of the clamp nuts 2 and 3. A bearing cone member 4 is detachably mounted on the axle near one end thereof, and a driving member 5 including a screw shaft 6 is rotatably mounted on the cone member 4 by means of bearings 7. A second bearing cone member 8 is adjustably mounted on the axle near the other end thereof, and is provided with a tapered surface 9 and an inwardly facing flat abutment surface 11.

A hub shell 12 is rotatably mounted on the driving member 5 by means of bearings 13, and on the cone member 8 by means of bearings 14, and is provided with a conical clutching surface 15 and a cylindrical surface 16. A clutch-nut member 17 is threaded on the screw shaft 6 and has a tapered surface 18 adapted to cooperate with the clutch surface 15 of the hub. The nut 17 also has dentals 19 arranged to cooperate with mating dentals 21 formed on an exterially tapered expander member 22 which is slidably journalled on the axle 1 in position to be engaged by the nut member 17 upon backward rotation of the screw shaft 6. A pair of semi-cylindrical clutch shoes 23 are located in the hub shell 12 and are provided with cylindrical exterior surfaces 24 conforming to the inner surface of the hub, and inner conical surfaces 25 adapted to bear on the tapered surfaces of the expander member 22.

A thrust washer 26 is located between the clutch shoes 23 and the abutment surface 11 of the cone member 8 and a spring 27 is interposed between the thrust washer and the clutch shoes so as to press the clutch shoes against the expander member 22, and the latter against the end of the screw shaft. A spring retarder member 28 is fixed in any suitable manner on the expander 22 and has flexible arms 29 bearing frictionally on the clutch nut 17 so as to insure traversal of the nut upon rotation of the screw shaft 6.

In operation, forward rotation of the driving member 5 by means of the sprocket 30 causes the screw shaft 6 to rotate in the direction of the arrow $a$ whereby the clutch nut 17 is moved to the left into clutching engagement with the surface 15 of the hub 12 so that the hub is caused to rotate in the forward direction. Upon reverse rotation of the driving member 5, the nut 17 is traversed to the right, engaging dentals 19, 21 and moving the expander member 22 to the right along with the clutch shoes 23 until the movement of the latter is arrested by the thrust washer 26. The clutch shoes are thereupon expanded by the member 22 into clutching engagement with the interior of the hub so that reverse rotation of the driving member 5 is thereby transmitted to the hub, the spring 27 and washer 26 acting as a thrust bearing against the flat abutment surface 11 of the bearing member 8.

When it is desired to convert this device to a coaster brake of the type illustrated in the patent to Hood, 2,410,785, all that is necessary is to remove and discard the clutch shoes 23, spring 27, and thrust washer 26, and to install the brake shoes 13, 14 and keys 21, 22 illustrated in the Hood patent. The device thereupon becomes a coaster brake precisely as disclosed in the Hood patent.

Although but one embodiment of the invention is shown and described in detail, it is understood that other embodiments are possible, and changes may be made in the precise arrangement of the parts without departing from the spirit of the invention.

I claim:

1. In a forward and backward driving hub for velocipedes and the like, a fixed axle, a bearing cone member mounted near one end thereof, a driving member including a screw shaft rotatably mounted on the bearing cone, a second bearing cone member mounted near the opposite end of the axle having an inwardly facing flat abutment surface, a hub shell rotatably mounted on the driving member and the second cone member having an interior clutch surface, a driving clutch nut member threaded on the screw shaft and movable into clutching engagement with the interior of the hub by forward rotation of the screw shaft, an exteriorly tapered expander member slidably journaled on the axle in position to be engaged by the nut member on backward rotation of the screw shaft, an interiorly tapered clutch shoe seated on the expander member and movable thereby radially outward into clutching engagement with the interior of the hub, and a thrust bearing between the clutch shoe and the flat abutment surface of the second bearing one member limiting longitudinal movement of the shoe while facilitating backward rotation thereof with the screw shaft and expander member.

2. A driving hub for velocipedes as set forth in claim 1, including also spring thrust means between the clutch shoe and the second cone bearing member maintaining the clutch shoe in engagement with the interior of the hub.

EDWIN ELLIOTT HOOD.

References Cited in the file of this patent

UNITED STATES PATENTS

| Number | Name | Date |
|---|---|---|
| 807,715 | Beverly | Dec. 19, 1905 |
| 2,530,764 | Gleasman | Nov. 21, 1950 |